United States Patent
Asnaashari

(10) Patent No.: US 9,229,706 B2
(45) Date of Patent: *Jan. 5, 2016

(54) METHOD AND APPARATUS FOR FIELD FIRMWARE UPDATES IN DATA STORAGE SYSTEMS

(71) Applicant: Micron Technology, Inc., Boise, ID (US)

(72) Inventor: Mehdi Asnaashari, Danville, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,106

(22) Filed: Mar. 11, 2015

(65) Prior Publication Data

US 2015/0186131 A1    Jul. 2, 2015

Related U.S. Application Data

(63) Continuation of application No. 12/109,284, filed on Apr. 24, 2008, now Pat. No. 9,009,357.

(51) Int. Cl.
| | |
|---|---|
| G06F 3/00 | (2006.01) |
| G06F 9/445 | (2006.01) |
| G06F 9/44 | (2006.01) |
| G06F 21/33 | (2013.01) |
| G06F 21/57 | (2013.01) |
| G06F 3/06 | (2006.01) |

(52) U.S. Cl.
CPC .............. *G06F 8/665* (2013.01); *G06F 3/0605* (2013.01); *G06F 3/0632* (2013.01); *G06F 3/0679* (2013.01); *G06F 8/65* (2013.01); *G06F 9/4411* (2013.01); *G06F 21/33* (2013.01); *G06F 21/572* (2013.01); *G06F 3/0607* (2013.01); *G06F 2221/031* (2013.01); *G06F 2221/2153* (2013.01)

(58) Field of Classification Search
CPC ...................................................... G06F 3/0607
USPC .............................................................. 710/8
See application file for complete search history.

(56) References Cited

U.S. PATENT DOCUMENTS

| | | |
|---|---|---|
| 6,167,567 A | 12/2000 | Chiles et al. |
| 6,199,194 B1 | 3/2001 | Wang et al. |
| 7,073,017 B2 | 7/2006 | Yamamoto |
| 7,181,458 B1 | 2/2007 | Higashi |
| 8,060,874 B2 | 11/2011 | Rengarajan et al. |
| 2002/0156888 A1 | 10/2002 | Lee et al. |
| 2003/0023966 A1 | 1/2003 | Shimizu et al. |
| 2004/0085359 A1 | 5/2004 | Steg et al. |
| 2005/0086198 A1 | 4/2005 | Shimizu et al. |
| 2005/0144616 A1 | 6/2005 | Hammond et al. |
| 2005/0190393 A1 | 9/2005 | Bledsoe et al. |
| 2005/0223268 A1 | 10/2005 | Tchen et al. |
| 2006/0007815 A1 | 1/2006 | Erickson et al. |
| 2006/0130046 A1 | 6/2006 | O'Neill |
| 2006/0143600 A1 | 6/2006 | Cottrell et al. |
| 2006/0282833 A1 | 12/2006 | Choe |

(Continued)

*Primary Examiner* — Chun-Kuan Lee
(74) *Attorney, Agent, or Firm* — Dorsey & Whitney LLP

(57) ABSTRACT

Data storage devices and methods for updating firmware are disclosed. For example, one such data storage device includes a device firmware and a controller, where the controller operates in accordance with the device firmware. The controller determines whether or not the device firmware can be updated with new firmware at least partially based on whether or not the new firmware meets a criterion related to a configuration profile of the device firmware.

21 Claims, 4 Drawing Sheets

(56) References Cited

U.S. PATENT DOCUMENTS

| | | |
|---|---|---|
| 2007/0169081 A1 | 7/2007 | Zhao et al. |
| 2008/0052699 A1 | 2/2008 | Baker et al. |
| 2008/0065816 A1 | 3/2008 | Seo |
| 2008/0120610 A1 | 5/2008 | Katano et al. |
| 2008/0125105 A1 | 5/2008 | Qumei et al. |
| 2008/0160983 A1 | 7/2008 | Poplett et al. |
| 2008/0208365 A1 | 8/2008 | Grgic et al. |
| 2008/0320110 A1 | 12/2008 | Pathak |
| 2009/0094597 A1 | 4/2009 | Moskalik et al. |
| 2010/0023777 A1 | 1/2010 | Prevost et al. |
| 2010/0153672 A1 | 6/2010 | Jogand-Coulomb et al. |
| 2011/0179405 A1 | 7/2011 | Dicks et al. |

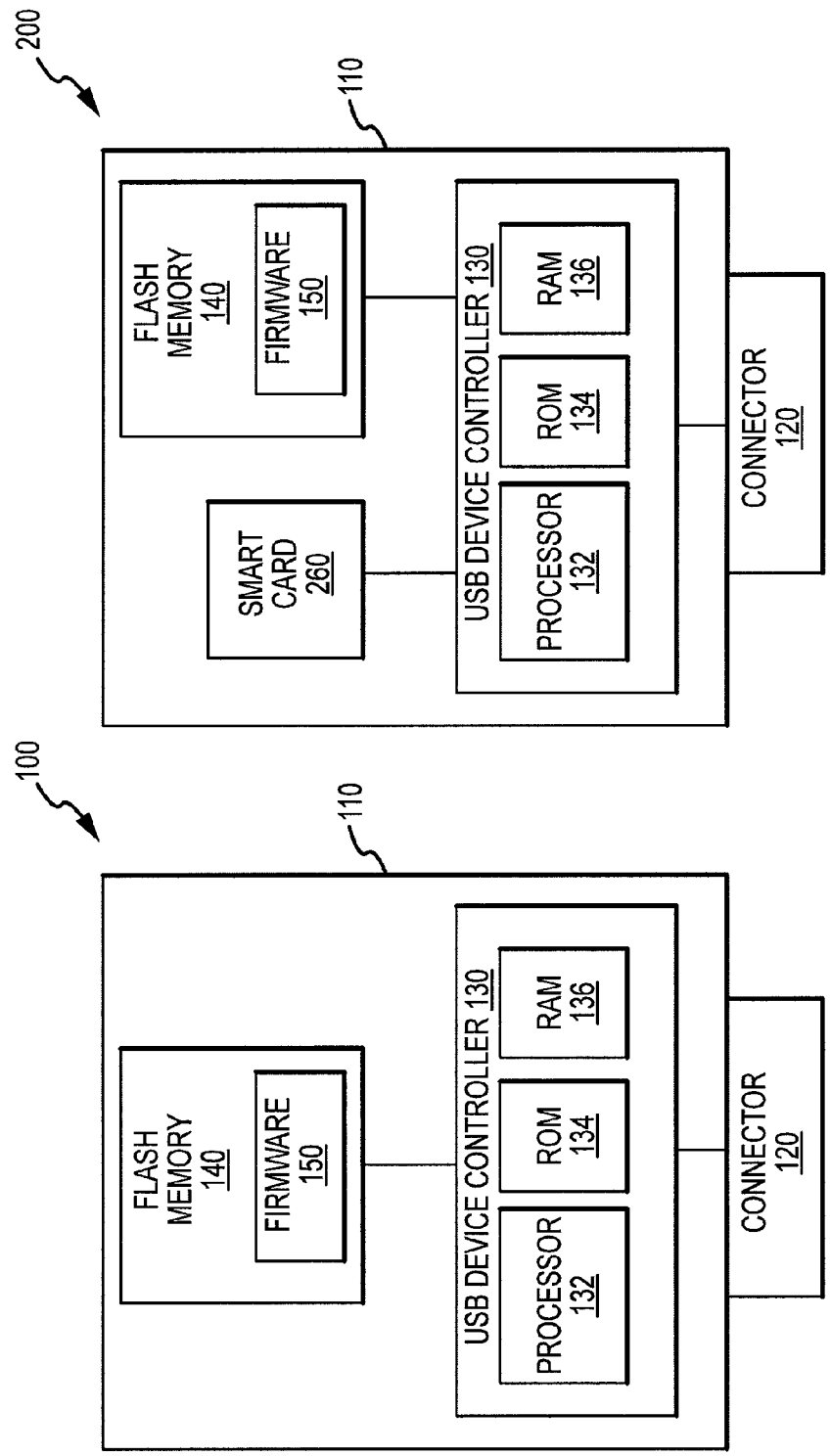

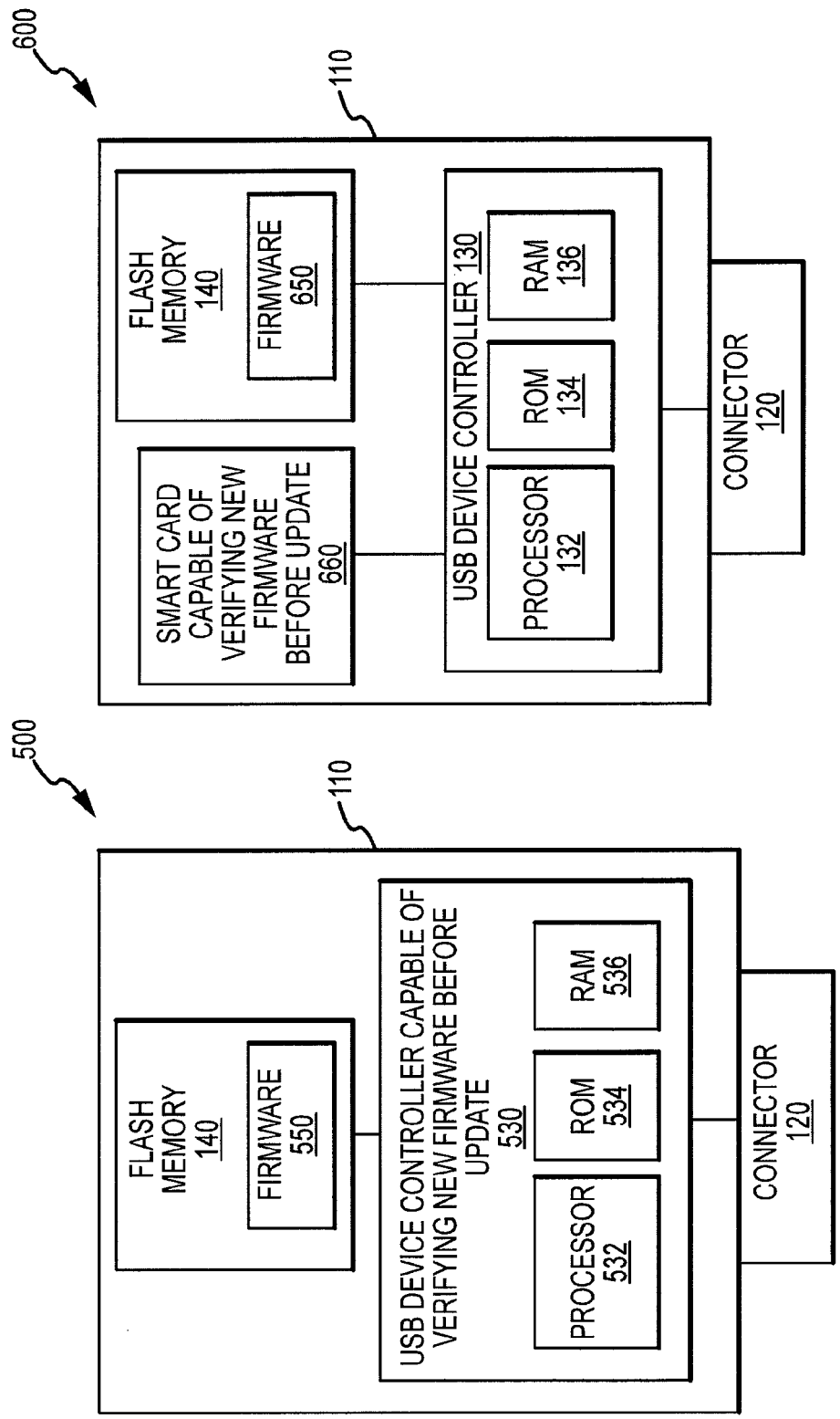

METHOD AND APPARATUS FOR FIELD FIRMWARE UPDATES IN DATA STORAGE SYSTEMS

RELATED APPLICATION(S)

This application is a continuation of pending U.S. patent application Ser. No. 12/109,284, filed Apr. 24, 2008, the application of which is hereby incorporated by reference therein, in its entirety, for any purpose.

TECHNICAL FIELD

Embodiments of this invention relate to data storage devices and, more particularly, to an apparatus and method for ensuring portable data storage devices are updated with correct firmware.

BACKGROUND OF THE INVENTION

As technology advances, the size of an integrated circuit that performs certain function has in general been shrinking continuously. More processing power, and more data storage capacity, can be packed into the same space that would be required previously for the same processing power or data storage capacity. As a result, the form factor of today's electronic devices is smaller, often much smaller, than the form factor of electronic devices from yesteryears. For example, universal serial bus ("USB") flash drives, a type of electronic device used mainly for data storage, may have a physical size smaller than a typical lighter but a data storage capacity ranging from 1 to 64 gigabytes.

Smaller form factor brings the benefit of portability. It has become possible for consumers to store relatively large amounts of information, including data, video, and music files, in a portable data storage device that can be easily carried from place to place. The relatively light weight and small physical size of portable data storage devices make them an ideal solution not only for data storage external to a host computer system, but also for data transfer between one computer and another. In the example of USB flash drives, a user can plug the device into a USB port of a first computer, computer A, to transfer data from computer A to the device, and then plug the device into a USB port of a second computer, computer B, to transfer data from the device to computer B. This is especially useful when data transfer between the two computers via other means is inconvenient or unavailable.

Like many electronic devices, a portable data storage device typically includes a microcontroller that manages the operations of the device based on an embedded computer program known as firmware. The firmware may be embedded in a hardware device, such as the microcontroller, provided on flash read-only memory ("ROM") or other type of non-volatile media that is part of the portable data storage device, or provided as a binary file that can be uploaded onto the device by a user. Regardless of the type of device, its firmware typically may be updated post-manufacturing, also known as field firmware update. Vendors of electronic devices using firmware provide firmware updates for various reasons, such as fixing bugs, adding new functionality. Because firmware updates can improve the performance, reliability, and even the available functionality of a device, vendors of electronic devices typically make firmware updates available regularly so that consumers can make field firmware updates for their devices. For instance, recording devices, such as optical media writers (DVD, CD, HD DVD, Blu-ray), are known to have field firmware updates regularly to ensure the hardware is kept up to date and compatible with the latest development in the technology. Similarly, portable data storage devices, such as USB flash drives and the like, also need field firmware updates from time to time.

Field firmware update, however, is not without potential risks or difficulties. One potential risk relates to the integrity of a newly received firmware that is meant to be used to update the existing firmware. More specifically, for example, a new firmware received by a user via the Internet could potentially have been tampered with by a hacker. One solution to ensuring the integrity of new firmware is the use of public key infrastructure ("PKI"), a well-known art in the field of cryptography. Under a PKI arrangement, computer users are enabled to be authenticated to each other without prior contact, and to use the private key information to encrypt messages, such as new firmware for firmware updates, to each other. When an encrypted message is received by a receiving party the message is destined for, the receiving party uses a sender public key to decrypt the encrypted message.

Another potential risk associated with field firmware updates is the possibility of loading firmware into a wrong platform. For example, a new firmware that works only with a first portable data storage device having a memory manufactured by vendor A could possibly be loaded into a second portable data storage device having a memory manufactured by vendor B. Even if the new firmware has no integrity problem as discussed above, it nevertheless should not be used to update the existing firmware in the second portable data storage device. This is because if an unaware user updates the existing firmware in the second portable data storage device with the new firmware that is meant for the first portable data storage device, the second portable data storage device could be rendered inoperable as a result of the firmware update.

There is, therefore, a need for a method and system to ensure portable data storage devices are updated with correct firmware.

BRIEF DESCRIPTION OF THE DRAWINGS

FIG. 1 is a block diagram illustrating a high-level view of the architecture of a prior art USB flash drive.

FIG. 2 is a block diagram illustrating a high-level view of the architecture of a prior art USB flash drive incorporating a smart card.

FIG. 5 is a block diagram illustrating a high-level view of the architecture of a USB flash drive with a microcontroller in accordance with an embodiment of the invention.

FIG. 6 is a block diagram illustrating a high-level view of the architecture of a USB flash drive incorporating a smart card in accordance with an embodiment of the invention.

DETAILED DESCRIPTION

Figure 3:
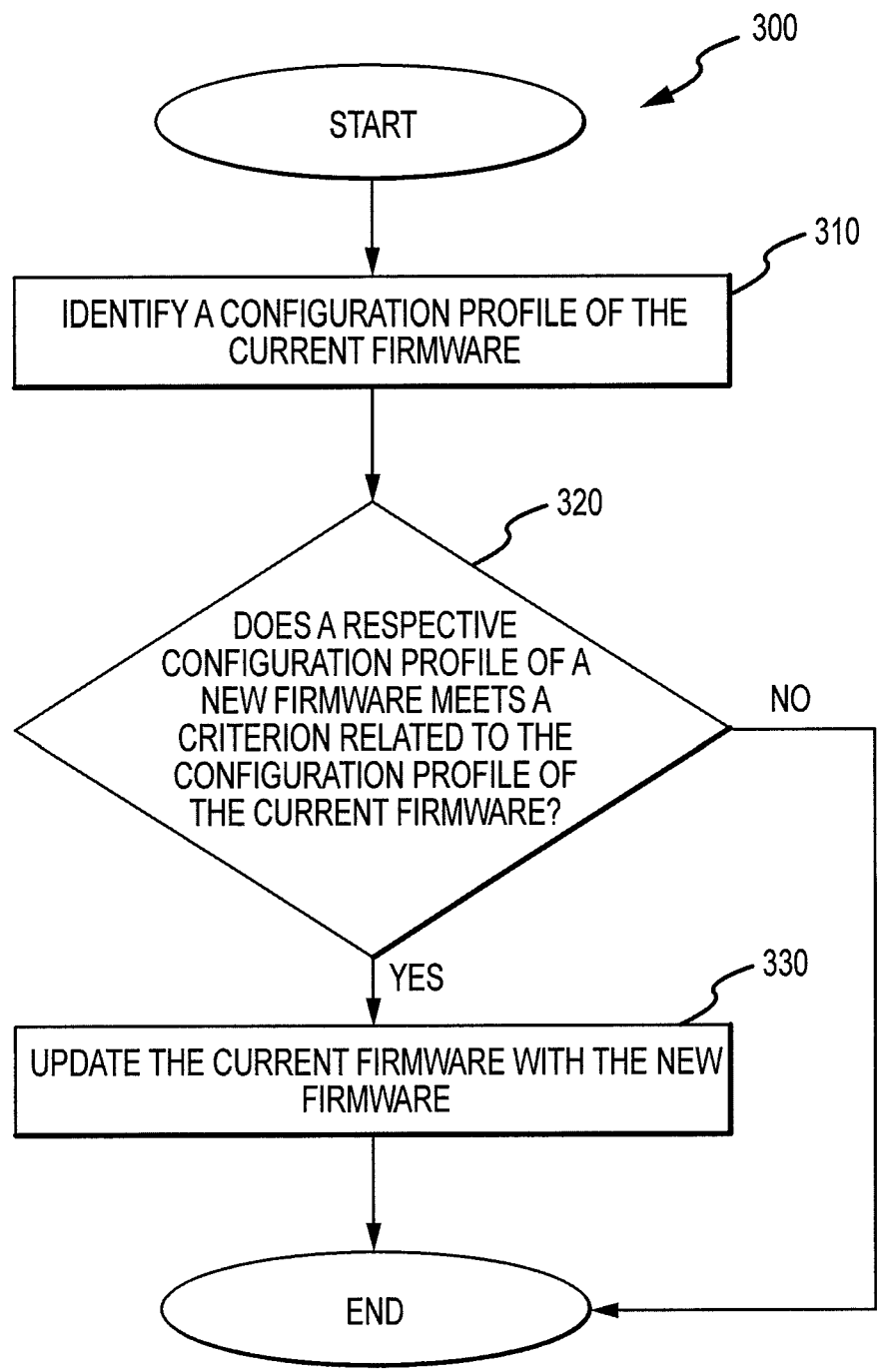
FIG. 3 is a flow chart illustrating a process of updating a current firmware of a data storage device in accordance with an embodiment of the invention.

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, and timing protocols have not been shown in detail in order to avoid unnecessarily obscuring the invention.

FIG. 1 illustrates a high-level view of an architecture of a prior art USB flash drive 100. The prior art USB flash drive 100 typically has a casing 110 that houses and protects internal components of the USB flash drive 100. The USB flash drive 100 also typically has a connector 120, such as a male type-A USB connector, for connecting the USB flash drive 100 to a USB port of a host computer (not shown). The connector 120 acts as a communication interface between the internal components of the USB flash drive 100 and the host computer. Inside the casing 110, the USB flash drive 100 typically has a USB device controller 130 and flash memory 140. The USB device controller 130 is coupled to the flash memory 140 to manage data access to the flash memory 140, such as reading data from or writing data into the flash memory 140, by the host computer that the USB flash drive 100 is connected to.

The USB device controller 130, also known as a USB mass storage controller in the art, typically includes a processor 132, such as a reduced instruction set computer ("RISC") microprocessor, a read-only memory ("ROM") 134, and a random access memory ("RAM") 136. The ROM 134 typically stores bootstrapping instructions that the processor 132 first executes on whenever the USB flash drive 100 is powered on.

The flash memory 140 may be a flash memory chip, such as NAND flash memory chip, that includes memory cells arranged in rows and columns for data storage. Data stored in the flash memory 140 can be erased, and new or updated data can be stored in the same memory cells that stored the previous data before the erasure or update. Accordingly, as shown in FIG. 1, the firmware 150 in the USB flash drive 100 is typically stored in the flash memory 140. This way, the firmware 150 can be updated with new firmware updates when the new updates are available. Alternatively, the firmware 150 may be stored in another memory (not shown) in the USB flash drive 100, such as a flash memory or another type of non-volatile memory, that is separate from the flash memory 140.

FIG. 2 illustrates a high-level view of an architecture of a prior art USB flash drive 200 incorporating a smart card. The USB flash drive 200 is constructed with components similar to those of the USB flash drive 100 as previously described, with the addition of a smart card 260. Thus, in the interest of brevity, description of most of the components of the USB flash drive 200 will not be provided as the above description pertaining to the components of the USB flash drive 100 also applies to the corresponding components of the USB flash drive 200. Moreover, those components of the USB flash drive 200 that are also in the USB flash drive 100 are labeled with the same numeral references.

The smart card 260 is coupled to the USB device controller 130 and may be used by the USB flash drive 200 to authenticate a user and to provide certain cryptographic capabilities, store critical security parameters such as passwords and personal identification numbers ("PIN"), keys and certificates, and allow access to the user data on flash memory 140. By requiring a user to authenticate himself/herself before data access to the USB flash drive 200 can be granted, the smart card 260 provides a layer of security protection to the data stored in the USB flash drive 200. Thus, when the USB flash drive 200 is connected to a host computer (not shown), a logon screen may be displayed to the user requesting the user to authenticate himself or herself using a PIN or password. Authentication typically takes the form of a negotiation between the host computer and the smart card 260, the result of the authentication process is made available to the USB device controller 130. The USB device controller 130 will then allow access to the data stored in the USB flash drive 200 if the result of the authentication is positive. Otherwise, access to the data stored in the USB flash drive 200 will be denied.

FIG. 3 is a flow chart showing a process 300 of updating a current firmware of a data storage device in accordance with an embodiment of the invention. The process 300 may be utilized to verify a new firmware before updating the firmware currently in use with the new firmware in an electronic device. The current firmware and the new firmware each has a respective configuration profile, which may be a set of configuration parameters or a plurality of configuration characteristics. The electronic device may be a data storage device like the USB flash drive 100. Alternatively, the electronic device may be a data storage device having a smart card such as the USB flash drive 200.

The process 300 begins by identifying a configuration profile of the current firmware (the firmware that is currently in use) in the USB flash drive in step 310. Next, in step 320, the process determines whether or not a corresponding configuration profile of a new firmware meets a criterion related to the identified configuration profile of the current firmware. If the corresponding configuration profile of the new firmware meets the criterion related to the configuration profile of the current firmware, the process proceeds to step 330; otherwise, the process ends with no firmware update taking place. In step 330, the firmware currently in use in the USB flash drive is updated with the new firmware.

In one embodiment, the configuration profile of the firmware currently in use may include, for example, controller type of the USB controller device, memory type of the memory in the USB flash drive, major version of the firmware, and minor version of the firmware. Additionally, each of the configuration parameters of the configuration profile has a respective attribute. For instance, for the configuration parameters of controller type and memory type, the respective attribute of the controller type indicates the type of controller (e.g. dual channel controller) supported by the firmware, and the respective attribute of the memory type may be the name of the manufacturer of the memory (e.g. Micron or one of the other memory chip manufacturers). Likewise, if the version of the firmware currently in use is, for example, version 2.5, then the respective attribute of the major version of the firmware is "2" and the respective attribute of the minor version of the firmware is "5".

In one embodiment, the criterion related to the identified configuration profile of the current firmware may be that a select one of the configuration parameters in the configuration profile of the current firmware has an attribute different from the attribute of the corresponding configuration parameter in the configuration profile of the new firmware while the attributes of other configuration parameters of the new firmware match those of the current firmware. For example, in one embodiment the select one of the configuration parameters may be the minor version of the firmware. In such case, only when the minor version of the new firmware is different from the minor version of the current firmware, while other configuration parameters of the new firmware are the same as those of the current firmware, will the current firmware be updated with the new firmware under the process 300. Accordingly, using the process 300 with such a criterion, the only field firmware update allowed will be minor-version updates (e.g. from version A.X to version A.Y, where X and Y are not equal), but not major-version updates (e.g. from version A.X to version B.Y, where A and B are not equal). Under such arrangement, a vendor of USB flash drives can release patches, bug fixes, and functionality upgrades as minor upgrades to the firmware shipped with the vendor's USB flash drives, so that users of the vendor's USB flash drives can themselves perform field firmware updates but not major firmware updates.

Other embodiments of the invention may each have a criterion different than the example just given. In an alternative embodiment, the criterion may be that the difference between the minor version of the new firmware may not exceed certain incremental value vis-à-vis the minor version of the current firmware. For example, if the new firmware is version 2.8 and the current firmware is version 2.5, resulting in a difference of 3 between the minor version of the new firmware (i.e. 8) and the minor version of the current firmware (i.e. 5), then the current firmware may or may not be updated with the new firmware. If the criterion is that the difference between the minor versions cannot exceed 2, then in the example the new firmware cannot be used to update the current firmware. If, however, the criterion is that the difference between the minor versions cannot exceed 4, then in the example the current firmware can be updated with the new firmware.

Figure 4:
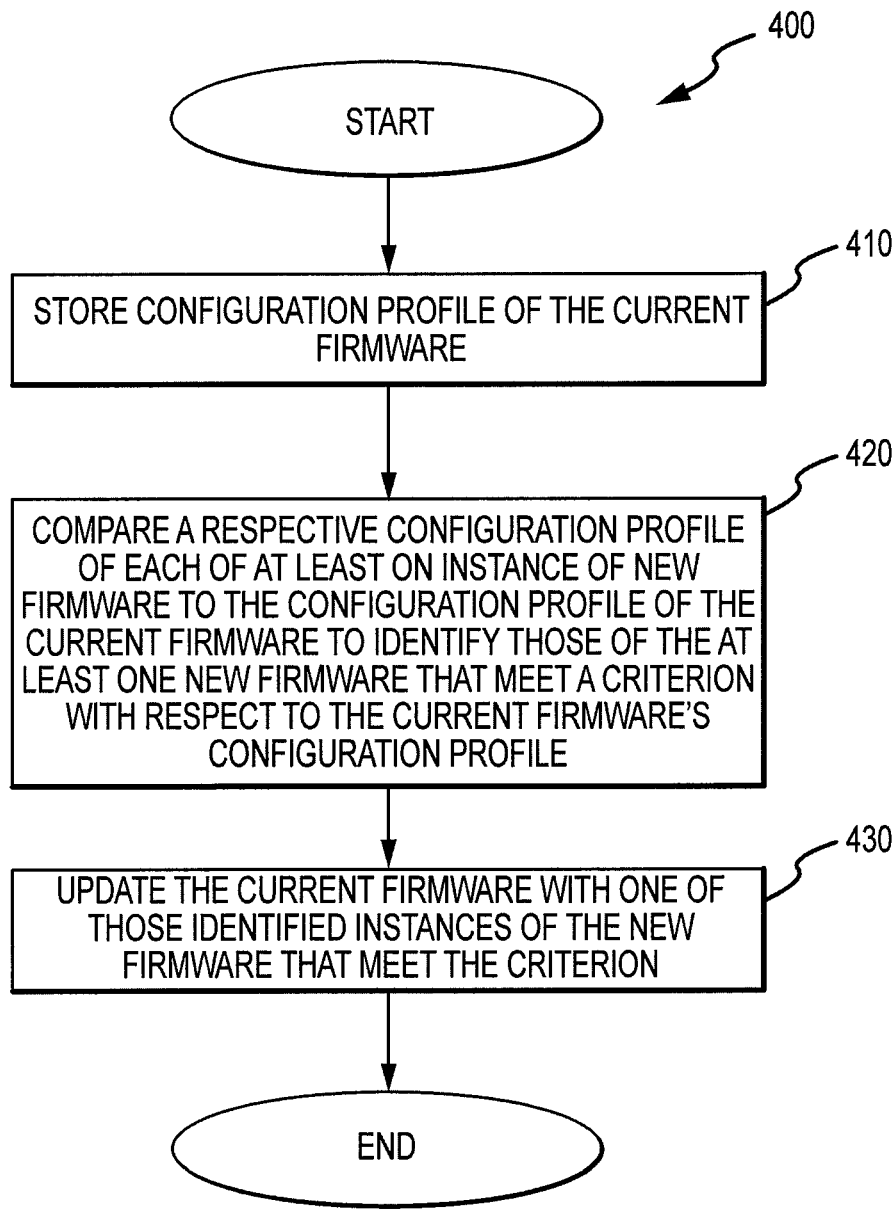
FIG. 4 is a flow chart illustrating a process of updating a current firmware of an electronic device in accordance with an embodiment of the invention.

FIG. 4 is a flow chart showing a process 400 of updating a current firmware of an electronic device in accordance with an embodiment of the invention. The process 400 may be utilized to verify a new firmware before updating the firmware currently in use with the new firmware in an electronic device, including a USB flash drive like the USB flash drive 100 or the USB flash drive 200. The process 400 may begin by storing a configuration profile of the current firmware in step 410. Alternatively, the process 400 may begin with step 420 if the configuration profile of the current firmware has already been stored before the initiation of process 400. As mentioned previously, a configuration profile may be a set of configuration parameters or a plurality of configuration characteristics. In step 420 the process 400 compares a respective configuration profile of each of at least one instance of new firmware to the configuration profile of the current firmware to identify those of the at least one instance of new firmware that meet a criterion with respect to the configuration profile of the current firmware. In step 430, the current firmware is updated with one of those identified instances of the new firmware that meet the criterion. It should be noted that step 430 may be performed automatically by the electronic device without user intervention, or alternatively, this additional step may be carried out by the user of the electronic device.

When a USB flash drive is connected to a host computer that may or may not be connected to the Internet (i.e. online), one or more instances of new firmware that can be downloaded and used to update the current firmware in the USB flash drive may become available. In one embodiment, a USB flash drive employing the process 400 may include a client program, for example, in its firmware or ROM, that communicates with a server run by the vendor of the USB flash drive to see if there are new firmware updates available for download when the USB flash drive is connected to a host computer that is online. If the vendor's server contains a pool of instances of new firmware, the process 400 may first verify to see which ones of the instances of new firmware meet a criterion and then display only those instances of new firmware that meet the criterion to the user, via a user interface such as a browser or pop-up screen on the screen/display panel of the host computer.

The criterion used by the process 400 may be similar to the criterion described with respect to the process 300 in one embodiment, and different in other embodiments. In one embodiment, the criterion may be the same as the criterion in the example previously described regarding the process 300. For example, if the versions of the available instances of new firmware available for download include versions 2.4, 2.6, 2.7, 3.0, and 3.1, then the process 400 may only allow versions 2.4, 2.6, and 2.7 to be downloaded for field firmware update if the version of the current firmware is of version 2.5 and if the criterion is that only the minor versions of a new firmware and the current firmware can be different. In another embodiment, using the same example given, only versions 2.6 and 2.7 will be allowed to be used to update the current firmware of version 2.5 if the criterion is that update is allowed only when the minor version of a new firmware is higher than the minor version of the current firmware while the major versions and other configuration characteristics are the same between the new firmware and the current firmware. In other embodiments, other criteria may be used without departing from the scope of the invention.

FIG. 5 illustrates a high-level view of an architecture of a USB flash drive 500 with a microcontroller in accordance with an embodiment of the invention. Much of the components of the USB flash drive 500 are the same as those of the USB flash drive 100. Thus, in the interest of brevity, those components of the USB flash drive 500 are labeled with the same numeral references as the corresponding components in the USB flash drive 100, and the description of which will not be repeated. The USB device controller 530 may include processor 532, ROM 534, and RAM 536. Unlike the USB device controller 130 of the USB flash drive 100, the USB device controller 530 is capable of verifying a new firmware before updating the current firmware 550 with the new firmware. In one embodiment, the USB flash drive 500 implements the process 300. In another embodiment, the USB flash drive 500 implements the process 400. In yet another embodiment, the USB flash drive 500 implements both of the processes 300 and 400. Whether it is the process 300, the process 400, or both of the processes 300 and 400, the instructions for performing the process(s) may be implemented in the firmware 550, for example, as part of the operating instruction of the firmware 550. Alternatively, the instructions for performing the process(s) may be implemented in the USB device controller 530, such as being part of the instruction stored in the ROM 534, for instance. In any case, according to embodiments of the invention, a field firmware update on the USB flash drive 500 will not be allowed unless the new firmware to be used for the update satisfies certain criterion. As such, a check and balance mechanism is provided to better ensure that only allowable firmware updates can take place.

FIG. 6 illustrates a high-level view of an architecture of a USB flash drive 600 incorporating a smart card in accordance with an embodiment of the invention. Much of the components of the USB flash drive 600 are the same as those of the USB flash drive 200. Thus, in the interest of brevity, those components of the USB flash drive 600 are labeled with the same numeral references as the corresponding components in the USB flash drive 200, and the description of which will not be repeated. Unlike the USB flash drive 200, however, the USB flash drive 600 includes a smart card 660 that is capable of verifying a new firmware before updating the current firmware 650 with the new firmware. In one embodiment, the USB flash drive 500 implements the process 300. In another embodiment, the USB flash drive 500 implements the process 400. In yet another embodiment, the USB flash drive 500 implements both of the processes 300 and 400. Whether it is the process 300, the process 400, or both of the processes 300 and 400, the instructions for performing the process(s) may be implemented in the firmware 650, for example, as part of the operating instruction of the firmware 650. Alternatively, the instructions for performing the process(s) may be implemented in the smart card 660 and carried out by the smart card 660. In any case, as with the USB flash drive 500, a field firmware update on the USB flash drive 600 will not be allowed unless the new firmware to be used for the update satisfies certain criterion.

In a device with a smart card, such as the USB flash drive 600, the integrity checking using PKI and version verification can be done by both the USB device controller 130 and the smart card 660. Using the smart card 660 to store the configuration profile and to perform the integrity checking and version verification will make the firmware update process more secure and less prone to attacks. The configuration profile may be stored in the smart card 660 during the manufacturing and updated subsequently with successful firmware update.

From the foregoing it will be appreciated that, although specific embodiments of the invention have been described herein for purposes of illustration, various modifications may be made without deviating from the spirit and scope of the invention. For example, although the above-described embodiments of the invention are directed to USB flash drives, alternative embodiments of the invention may be applied to other types of electronic devices that run on firmware that can be updated in the field by the user. Accordingly, the invention is not limited except as by the appended claims.

What is claimed is:

1. An apparatus comprising:
a memory device including device firmware; and
a controller coupled to the memory device, the controller configured to determine whether the device firmware can be updated with new firmware based on a difference between a minor version of the new firmware and a minor version of the device firmware,
wherein the device firmware is not updated with the new firmware when the difference between the minor version of the new firmware and the minor version of the device firmware exceeds an incremental value, and
wherein the device firmware is updated with the new firmware when the difference between the minor version of the new firmware and the minor version of device firmware does not exceed the incremental value.

2. The apparatus of claim 1, wherein access to the memory device is provided to a host responsive to authenticating the host.

3. The apparatus of claim 1, wherein access to the memory device is provided to a host responsive to providing cryptographic capabilities to the host.

4. The apparatus of claim 1, wherein the controller is further configured to determine whether the device firmware can be updated with the new firmware based on the minor version of the new firmware and the minor version of the device firmware,
wherein the device firmware is not updated with the new firmware when the minor version of the new firmware is less than the minor version of the device firmware, and
wherein the device firmware is updated with the new firmware when the minor version of the new firmware is higher than the minor version of device firmware.

5. The apparatus of claim 1, wherein the controller is further configured to check for available instances of new firmware when the apparatus is connected to a host system.

6. The apparatus of claim 1, wherein the controller is further configured to compare a respective configuration profile of the new firmware with a configuration profile of the device firmware to identify if the new firmware can be used to update the device firmware.

7. The apparatus of claim 1, wherein the controller comprises a device controller coupled to a memory and configured to control data storage in and retrieval from the memory, and wherein the apparatus further comprises a smart card coupled to the device controller.

8. The apparatus of claim 7, wherein a configuration profile of the device firmware is stored in the smart card, and wherein the smart card is configured to determine whether or not the device firmware can be updated with the new firmware based at least in part on a comparison of the configuration profile of the device firmware and a configuration profile of the new firmware.

9. An apparatus comprising:
a memory;
a device firmware stored in the memory;
a device controller coupled to the memory and configured to control data storage in and retrieval from the memory; and
a smart card coupled to the device controller, the smart card configured to verify whether one or more of a plurality of new firmware instances can be used to update the device firmware before updating the firmware based on a difference between a version of the device firmware and a version of each of the one or more of a plurality of new firmware instances,
wherein the firmware is not updated with the one or more of the plurality of new firmware instances when the difference between the version of the device firmware and the version of each of the one or more of the plurality of new firmware instances exceeds the incremental value, and
wherein the firmware is updated with the one or more of the plurality of new firmware instances when the difference between the version of the device firmware and the version of each of the one or more of the plurality of new firmware instances does not exceed the incremental value.

10. The apparatus of claim 9, wherein the smart card is further configured to verify whether or not one or more of the plurality of new firmware instances can be used to update the device firmware, based at least in part, on a configuration profile of the device firmware, the smart card further configured to determine whether or not a respective configuration profile of the one or more of the plurality of new firmware instances meets a criterion related to the configuration profile of the device firmware.

11. The apparatus of claim 10, wherein the smart card is further configured to update the device firmware with the one or more of a plurality of new firmware instances if the configuration profile of the one or more of the plurality of new firmware instances meets the criterion related to the configuration profile of the device firmware.

12. The apparatus of claim 9, wherein the smart card is further configured to store a configuration profile of the device firmware, and the device controller is further configured to compare a respective configuration profile of each of the plurality of new firmware instances to the configuration profile of the device firmware to identify those of the one or more of the plurality of new firmware instances that meet a criterion with respect to the configuration profile of the device firmware.

13. The apparatus of claim 12, wherein the smart card is further configured to update the device firmware with one of the plurality of new firmware instances without user intervention.

14. The apparatus of claim 12, wherein the smart card is further configured to update the device firmware with one of the plurality of the new firmware instances with user intervention.

15. The apparatus of claim 9, wherein the smart card is further configured to verify whether one or more of a plurality of new firmware instances can be used to update the device firmware before updating the firmware based on the version of the device firmware and the version of each of the one or more of a plurality of new firmware instances,
- wherein the firmware is not updated with the one or more of the plurality of new firmware instances when the version of the device firmware is higher than the version of each of the one or more of the plurality of new firmware instances, and
- wherein the firmware is updated with the one or more of the plurality of new firmware instances when the version of the device firmware is less than the version of each of the one or more of the plurality of new firmware instances.

16. A method comprising:
- determining, with a controller, a difference between a minor version of a new firmware and a minor version of a current firmware of a memory device;
- updating the current firmware of the memory device with the new firmware when the difference between the minor version of the new firmware and the minor version of the current firmware of the memory device does not exceed an incremental value; and
- not updating the current firmware of the memory device when the difference between the minor version of the new firmware and the minor version of the current firmware of the memory device exceeds an incremental value.

17. The method of claim 16, further comprising authenticating a host responsive, at least in part, to receipt of a host signal.

18. The method of claim 17, further comprising providing access to the memory device responsive to authenticating the host.

19. The method of claim 18, wherein authenticating the host comprises receiving a password, a personal identification number, a key, a certificate, or combinations thereof.

20. The method of claim 16, further comprising checking for available instances of new firmware when the memory device is coupled to a host.

21. The method of claim 16, further comprising indicating to a host whether the current firmware of the memory device may be updated with the new firmware.

* * * * *